(12) United States Patent
Hundscheidt et al.

(10) Patent No.: US 8,095,116 B2
(45) Date of Patent: Jan. 10, 2012

(54) METHOD FOR DELIVERING MULTIMEDIA FILES

(75) Inventors: Frank Hundscheidt, Kerkrade (NL); Ralf Keller, Wurselen (DE); Thorsten Lohmar, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1030 days.

(21) Appl. No.: 11/720,382

(22) PCT Filed: Nov. 30, 2004

(86) PCT No.: PCT/EP2004/013593
§ 371 (c)(1),
(2), (4) Date: Jan. 14, 2008

(87) PCT Pub. No.: WO2006/058544
PCT Pub. Date: Jun. 8, 2006

(65) Prior Publication Data
US 2008/0305773 A1    Dec. 11, 2008

(51) Int. Cl.
*H04W 4/00* (2009.01)
*H04M 3/42* (2006.01)
*H04M 11/10* (2006.01)
*H04M 11/00* (2006.01)

(52) U.S. Cl. .................... 455/412.1; 455/466; 455/413; 379/88.13

(58) Field of Classification Search .................. 455/466, 455/412.1, 413; 379/88.13
See application file for complete search history.

(56) References Cited

U.S. PATENT DOCUMENTS

| | | | |
|---|---|---|---|
| 5,996,015 A | 11/1999 | Day et al. | |
| 2002/0181506 A1* | 12/2002 | Loguinov | 370/473 |
| 2003/0093694 A1* | 5/2003 | Medvinsky et al. | 713/201 |
| 2004/0005877 A1* | 1/2004 | Vaananen | 455/412.1 |
| 2005/0021834 A1* | 1/2005 | Coulombe | 709/236 |
| 2005/0259690 A1* | 11/2005 | Garudadri et al. | 370/477 |
| 2005/0287993 A1* | 12/2005 | Gogic | 455/413 |

FOREIGN PATENT DOCUMENTS

| | | |
|---|---|---|
| EP | 1 315 354 A | 5/2003 |
| WO | WO 01/24474 A | 4/2001 |
| WO | WO 2004/088501 A | 10/2004 |

* cited by examiner

*Primary Examiner* — Jinsong Hu
*Assistant Examiner* — Opiribo Georgewill

(57) ABSTRACT

A technique for delivering a multimedia data file, such as an MMS, from an originator having an originator server associated therewith to a recipient having a recipient server associated therewith is provided. The technique comprises establishing a communication path from the originator to the recipient via the originator server and recipient server. The recipient server receives the data file or portions thereof uploaded to the originator server from the originator. Thereafter, the recipient server individually forwards the data file portions received from the originator server without waiting for receipt of the complete data file.

19 Claims, 7 Drawing Sheets

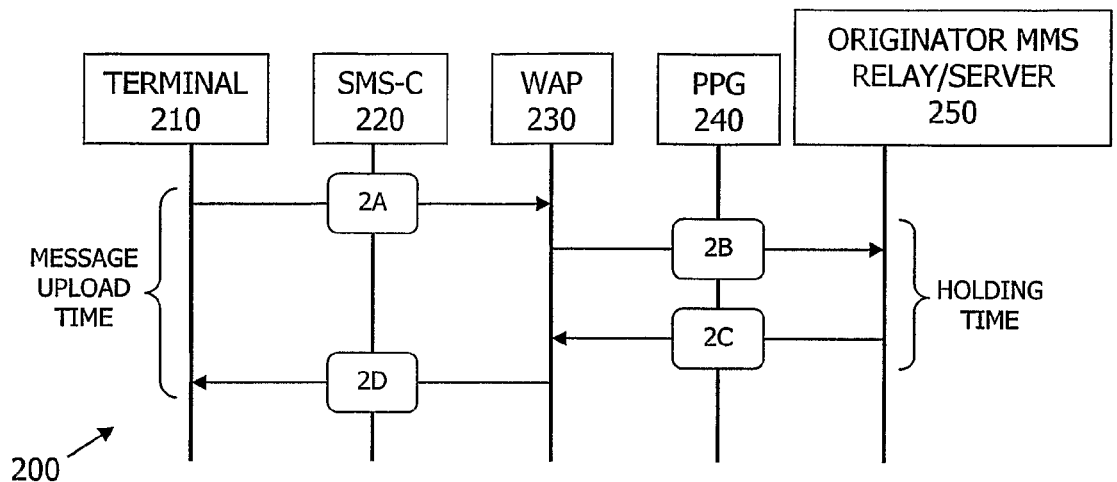
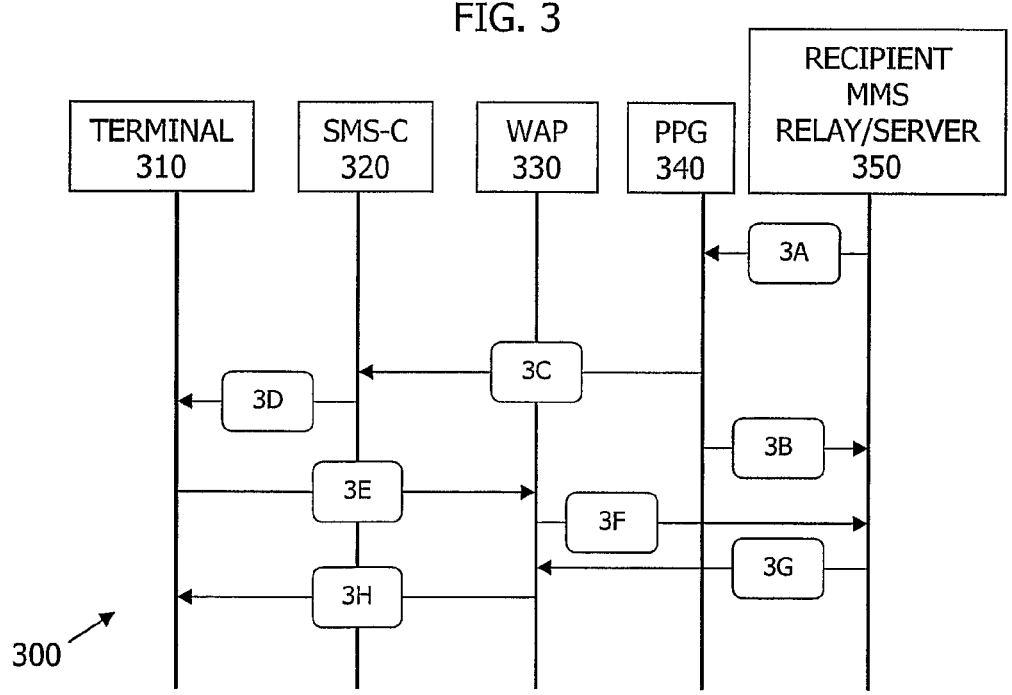

METHOD FOR DELIVERING MULTIMEDIA FILES

FIELD OF THE INVENTION

The invention relates to communications. More specifically, the invention relates to a technique for efficiently delivering multimedia files such as Multimedia Messaging Service messages containing multimedia content.

BACKGROUND OF THE INVENTION

As wireless network throughput capacity increases as well as the sophistication of mobile communications devices, Multimedia Messaging Service (MMS) type data transfers are becoming increasingly popular among users. However, current techniques for transferring such messages are not efficient and consume unnecessary network resources while also resulting in delays in both transferring and receiving an MMS.

With conventional systems, an MMS is typically sent from an originator network component to a server or relay associated therewith, which forwards the multimedia message to a server or relay associated with a recipient network component (or simply recipient). The recipient server then notifies the recipient about the MMS upon which the recipient retrieves the content from the server. The content retrieval and a read-reply are acknowledged by the recipient and returned to the originator server and eventually to the originator network node.

FIG. 1 provides a signaling diagram 100 which details the signals exchanged among an Originator MMS User Agent (UA) 110 of an originating terminal, an Originator MMS Relay/Server (or briefly Originator MMS Server) 120, a Recipient MMS Relay/Server (or briefly Recipient MMS Server) 130, and a Recipient MMS UA 140 of a recipient terminal with regard to the transfer of an MMS using conventional techniques. Via signal MA a request is issued to transfer an MMS from the Originator MMS UA 110 to the Originator MMS Server 130 (e.g., MM1_submit.REQ) which is replied to via signal 1B (e.g., MM1_submit.RES). Thereafter, the Originator MMS Server 120 forwards the request to the Recipient MMS Server 130 via signal 1C (e.g., MM4_forward.REQ), which is replied to by signal 1D (e.g., M4_forward.RES). The Recipient MMS Server 130 then notifies the Recipient MMS UA 140 about the request via signal 1E (e.g., MM1_notification.REQ) which is responded to by signal 1F (e.g., MM1_notification.RES).

If the Recipient MMS UA 140 chooses to accept the transfer of the MMS as provided in the request, signal 1G is generated and sent to the Recipient MMS Server 130 (e.g., MM1_retrieve.REQ) and a response is then sent back to the Recipient MMS UA 140 via signal 1H (e.g. MM1_retrieve.RES). With signal 1I, the Recipient MMS UA 140 then sends a content retrieval acknowledgment to the Recipient MMS Server 130 (e.g. MM1_acknowledgment.REQ), which then sends a signal 1J to the Originator MMS Server 120 reporting about the content (e.g., MM4_delivery_report.REQ) which is subsequently replied to via signal 1K (e.g., MM4_delivery_report.RES). The Originator MMS Server 120 then sends signal 1L to the Originator MMS UA 110 acknowledging the delivery report (e.g., MM1_delivery_report.REQ). The Recipient MMS UA 140 also sends a read reply acknowledgment via signal 1M (e.g., MM1_read_reply_recipient.REQ), which then sends a signal 1N to the Originator MMS Server 120 reporting about the content (e.g., MM4_delivery_report.REQ) which is subsequently replied to via signal 1K (e.g., MM4_delivery_report.RES). The Originator MMS Server 120 thereafter sends a read reply acknowledgment signal 1P (e.g., MM1_read_reply_originator.REQ) to the Originator MMS UA 110.

Notwithstanding the growing popularity of MMS, the amount of time required to deliver an MMS can be lengthy. One cause of delivery delays is shown in connection with the signaling diagram 200 of FIG. 2 which illustrates signaling among an originating network component such as an originating terminal 210, a Short Messaging Service Center 220 (SMS-C), a WAP Proxy 230, a Push Proxy Gateway 240 (PPG), and an originating Multimedia Messaging Center (MMC), i.e. an Originator MMS Relay/Server 250. The originating terminal 210 sends an MMS in signal 2A via WAP Proxy 230 and signal 2B to the originating MMC 250. With slow-speed network access, it can take up to forty (40) seconds until the MMS content is fully uploaded to the MMC 250. After the upload is finalized, the reception of the MMS is acknowledged by the originating MMC 250 via signals 2C and 2D. The originator MMC 250 then forwards the MMS to the recipient MMS Relay/Server (not shown) which also acknowledges the reception of the MMS.

FIG. 3 illustrates a signaling diagram 300 with similar components as FIG. 2, but in relation to the retrieval of an MMS by a recipient network component such as a recipient terminal 310. Via signal 3A a Push Access Protocol message is sent from an MMC, i.e., the Recipient MMS Relay/Server 350 associated with the recipient terminal 310 to a PPG 340, which acknowledges the message via signal 3B. A Short Message Peer-to-Peer protocol message 3C is sent from the PPG 340 to a SMS-C 320, which subsequently notifies the recipient terminal 310 of the MMS via signal 3D. The recipient terminal 310 may then send a notification to obtain the MMS in signal 3E via WAP Proxy 330 and signal 3F to the recipient MMC 350. The MMC 350 then downloads the MS to the recipient terminal via signals 3G and 3H. Similar to the uploading of the MMS to the originating MMC 250, the downloading of the MMS from the recipient MMC 350 to the recipient terminal 310 may also take up to forty (40) seconds depending on the speed of the network.

Accordingly, from the above, it will be recognized that the transfer of an MMS is accomplished substantially through three independent stages:
1. Originating network component to originator MMS Relay/Server;
2. Originator MMS Relay/Server to Recipient MMS Relay/Server; and
3. Recipient MMS Relay/Server to recipient network component.

As such, the delivery of an MMS using conventional techniques is unnecessarily lengthy (especially if there is only a low-speed network access available) and results in the consumption of significant buffer space in the Originator and Recipient MMS Relay/Servers (which is based in part on the high number of parallel ongoing transmissions). Such delays can be compounded as the size of the MMS increases (e.g., in the case of large video clips).

The delays in receiving an MMS negatively affect user experience at a recipient network component and may discourage users from sending an MMS (and thus reduces potential throughput revenues to network operators). For example, in some cases, such as with regard to sports or news clips, a user may be eagerly waiting for the MMS to be fully loaded. In other cases, a user may know that an MMS is on the way, such as when the user is also participating in a voice session with the originating user and the MMS is sent in parallel (e.g., via combinational services, and the like), and that delay in delivery may negatively affect the interactions with other users. Delays are also problematic in multi-user group sessions in which a single user sends an MMS to all participants. As the receiving participants may have registered for the multi-user content, they are supposed to be ready for content reception.

Accordingly, there remains a need for an improved technique for delivering an MMS or a similar message from an originator to a recipient.

SUMMARY OF THE INVENTION

The invention is embodied in a method for delivering a multimedia data file, such as an MMS, from an originator having an originator server associated therewith to a recipient having a recipient server associated therewith. Such a method may comprise establishing a communication path from the originator to the recipient via the originator server and recipient server. The method may further comprise the reception, by the recipient server, of portions of the data file from the originator server (with each of the data file portions or the complete data file being uploaded to the originator server from the originator). Thereafter, and without waiting for receipt of the complete data file, the recipient server individually forwards the data file portions received from the originator server for reassembly by the recipient.

The communication path to the recipient server and also to the recipient may be established before the entire data file was uploaded to the originator server. Accordingly, the recipient (or it's internal component handling the data file, such as an MMS User Agent) may be online and reachable already initially (e.g., before the upload of the data file to the originator server starts). Delivery of the data file may thus be accelerated by a simultaneous upload, propagation and download of the data file content. Alternatively, the communication path may be established in two or more steps (e.g. during data file upload or after the data file was uploaded to the originator server).

The individual data file portions could be directly forwarded towards the recipient via a (semi-) permanent communication path that is established for the time of the data file transmission. In many cases the information necessary to establish the communication path to the recipient is initially available (e.g., before the upload of the data file content or portions thereof to the originator server starts). To establish the communication path, a negotiation may be performed (also to agree on the communication principles to be used for the data file transfer). The information exchanged in this regard may include information about the size of the data file to be transferred. As can be appreciated, various optional modifications may be made to the method depending on the desired configuration. For example, the method may further comprise the step of receiving, by the recipient server, an acknowledgment that the data file was correctly reassembled. In addition, or in the alternative, the method may also include the step of sending, by either the recipient server to the originator server or the recipient to the recipient server to the originator server, a message indicating that a data file portion has not been received. Similarly, messages may be sent by either the recipient server to the originator server or the recipient to the recipient server to the originator server, a message indicating that a data file portion to has been properly received.

In order to minimize the transfer of data file portions via the radio network, at least one of the originator server and the recipient server may cache received data file portions so that such data file portions may be quickly resent if they were not properly received by the adjacent component within the data traffic flow.

The method may also include the step of subdividing, by at least one of the originator and the originator server, the data file into the data file portions. If the data file is subdivided by the originator, then fewer network resources are consumed. As a result, network operators might charge different tariffs depending on whether a data file is subdivided by the originator or by the originator server or some other network component (especially if at least one of the originator and the recipient is a mobile communications device). In connection therewith, the method may also include the step of associating a billing charge with the transfer of the data file based on the amount of processing capacity utilized by at least one of the originator server and the recipient server.

The method may also include steps in which parameters for transferring the data file from the originator to the recipient are established or negotiated. With this variation, the method may further comprise the steps of receiving, by the recipient server, a transfer inquiry from the originator server generated in response to a request from the originator, the transfer inquiry containing or referencing initial parameters regarding the transfer of the data file, determining, by the recipient server, whether to modify the initial parameters, and sending, by the recipient server, a response to the transfer inquiry including or referencing final parameters that include either an acceptance of the initial parameters or modified parameters, and receiving, by the recipient server, the data file delivered according to the final parameters for transfer to the recipient. It will also be appreciated by the skilled artisan, that such a pre-transfer negotiation may be utilized both in connection with the data file transfer method described above as well as separately and that the negotiation technique may also be applied to other communication scenarios.

The parameters pertaining to the delivery of the data file may relate to a variety of factors and may optionally be chosen from the group comprising data file content type, data file content size, codecs applied to code the content, the number of parts of the data file, the size of each data file part, sequence numbering of data file parts, procedure to request lost data file parts, number of recipients, and acknowledgment protocols utilized.

In order to minimize the number of signals or messages exchanged with regard to the establishment of the communication parameters, the initial parameters may contain at least two different techniques for delivering the data file to the recipient and the response may include either an acceptance of one of the at least two different techniques or modified parameters. The method may also provide that the originator selects the communications parameters from at least two pre-defined communication parameter sets and these sets may ultimately be forwarded to the recipient server and/or the recipient.

The method may also provide that the originator server stores the request and it may also provide that the recipient server stores the transfer inquiry—e.g., in case retransmission of such messages (or messages resulting therefrom) is required or in case a transcoding is to be performed.

Additional steps that may be included in the method include forwarding, by the recipient server, the transfer inquiry to the recipient, and receiving, by the recipient server, a response to the transfer inquiry including the final parameters. Optionally, when the recipient server forwards the transfer inquiry, it may modify the transfer inquiry according to predetermined transfer inquiry criteria (which may in turn be stored in a database) and forwards the modified transfer inquiry to the recipient. Alternatively, the method may include the step of generating, by the recipient server (rather than by the recipient), a response to the transfer inquiry based on predetermined delivery criteria (which may be stored in a database). The predetermined delivery criteria may include known capabilities of the recipient.

Moreover, the method may also include the step of converting, by either the recipient or the recipient server, the response to a format compatible with at least one of the originator server and the originator.

In another embodiment, a method for delivering a multimedia data file, such as an MMS, from an originator having an originator server associated therewith to a recipient having a recipient server associated therewith is provided. This method comprises establishing a communication path from the originator to the recipient via the originator server and the recipient server. The method further comprises receiving, by the originator server from the originator, the data file or portions of the data file, and, if the data file is received, splitting the data file into data file portions, and individually forwarding, by the originator server and without waiting for receipt of the complete data file, the data file portions received from the originator for reassembly by the recipient.

According to one variant, at least one of the originator server and the recipient server receives one or more data file portions including at least one of a header and control information in relation to the data file. According to a further variant, the originator server receives the data file in a single message together with at least one of a header and control information. Both variants allow the originator server and/or the recipient server to immediately start processing at least one of the header and the control information without waiting for the complete receipt of the data file. Accordingly, the originator server and/or the recipient server may determine transmission related aspects like the recipient of the data file and/or the length of the data file at a very early stage of the data file transmission.

In fact, the intermediate nodes like the originator server and the recipient server do not need any knowledge about the data file content to begin their dedicated processing operations. Accordingly, the originator server may notify the recipient server of information in relation to the data file that is to be forwarded by the originator server while the originator server still receives the data file or the data file portions from the originator. This gives rise to a simultaneous, or "interleaved" (i.e., not strictly sequential), messaging procedure between the originator server and the originator on the one hand and the originator server and the recipient server on the other hand. The advantage of such a procedure is the fact that the recipient server may for example allocate resources for the data file it will receive and/or inform the recipient of the data file transmission at a very early stage.

The invention may also be embodied in a computer program product, which may be stored on a computer readable recording medium, comprising program code portions for performing the steps of the methods described herein when the computer program product is run on one or more computers or computer systems.

In yet another variation, the invention is embodied in a system comprising a computer processor and a memory coupled to the processor, where the memory is encoded with one or more programs that perform the steps of the methods described herein.

An apparatus to deliver a multimedia data file, such as an MMS, from an originator having an originator server associated therewith to a recipient via an established communication path is also enabled by the current invention. Such an apparatus may comprise a reception unit to receive portions of the data file from the originator server, the data file or the data file portions being uploaded to the originator server from the originator, and a relay unit to individually forward the portions of the data file received from the originator server for reassembly by the recipient, wherein the data file portions are forwarded without waiting for receipt of the complete data file.

Similarly, the invention may also comprise an apparatus to deliver a multimedia data file, such as an MMS, from an originator to a recipient having a recipient server associated therewith via an established communication path. Such an apparatus may comprise a reception unit to receive the data file or portions of the data file from the originator, and, if the data file is received, to split the data file into data file portions, and a relay unit to individually forward the data file portions received from the originator for reassembly by the recipient, wherein the data file portions are forwarded without waiting for receipt of the complete data file.

In still another embodiment, the invention takes the form of a system to deliver a multimedia data file, such as an MMS, via an established communication path. The system includes an originator user agent to initiate transmission of the data file, a recipient user agent, an originator server associated with the originator user agent, and a recipient server associated with the recipient user agent. In operation, the originator uploads the data file or data file portions to the originator server, the originator server sends a plurality of portions of the data file to the recipient server, and the recipient server individually forwards the portions of the data files received to the recipient for reassembly without waiting for receipt of the complete data file.

BRIEF DESCRIPTION OF THE DRAWINGS

In the following the invention will be described with reference to exemplary embodiments illustrated in the figures, in which:

FIG. 2 is a second signalling diagram showing a technique relating to the transfer of a multimedia data file;

FIG. 3 is a third signalling diagram showing a technique relating to the transfer of a multimedia data file;

DETAILED DESCRIPTION OF PREFERRED EMBODIMENTS

In the following description, for purposes of explanation and not limitation, specific details are set forth, such as particular signal formats, etc. in order to provide a thorough understanding of the current invention. It will be apparent to one skilled in the art that the current invention may be practiced in other embodiments that depart from these specific details. For example, the skilled artisan will appreciate that the current invention may be utilized in connection with multimedia data file types and messaging services other than MMS in which there is a need for more efficient transfer of data.

Moreover, those skilled in the art will also appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs). It will also be appreciated that while the current invention is primarily described as a method, it may also be embodied in a system comprising a computer processor and a memory coupled to the processor, wherein the memory is encoded with one or more programs that may perform the methods disclosed herein.

Figure 1:
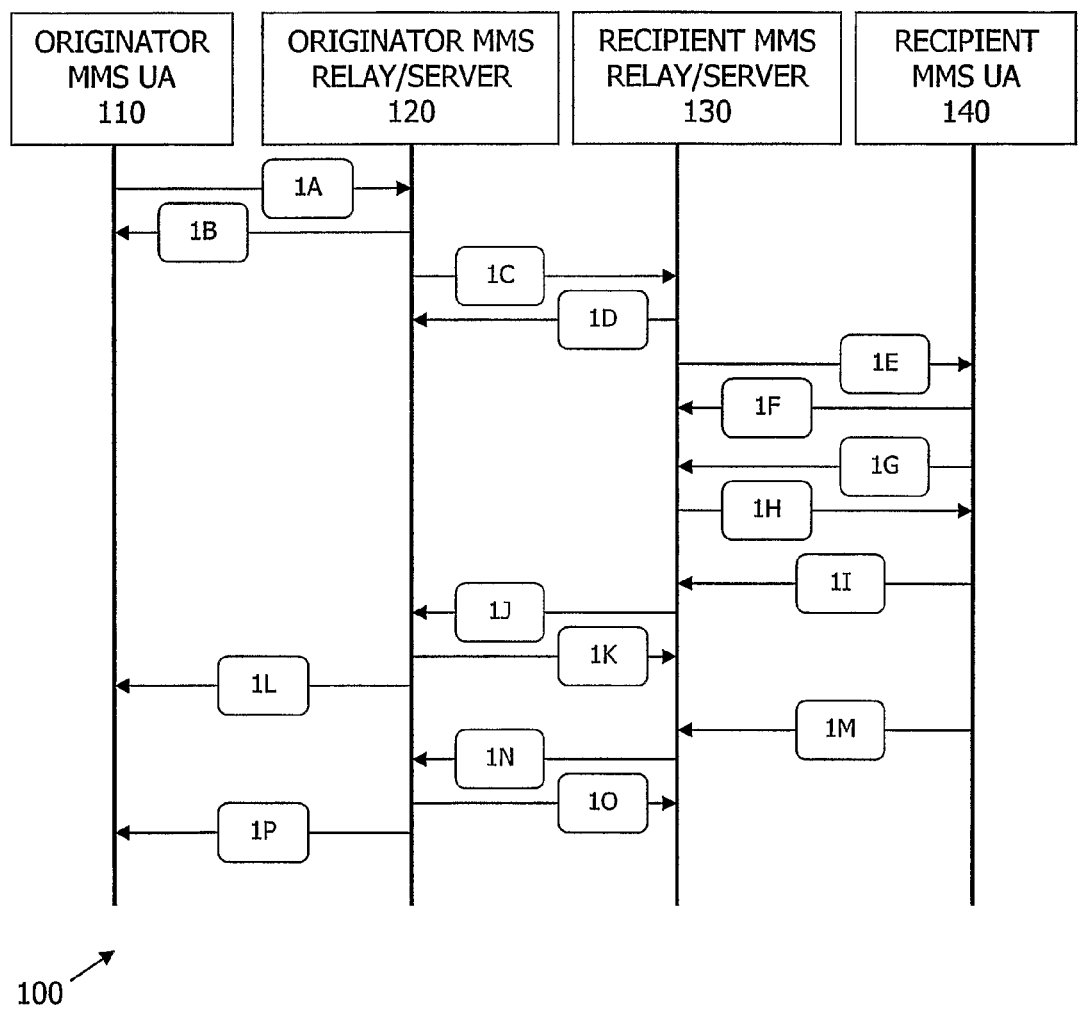
FIG. 1 is a first signalling diagram showing a technique relating to the transfer of a multimedia data file.
Figures 4, 5:
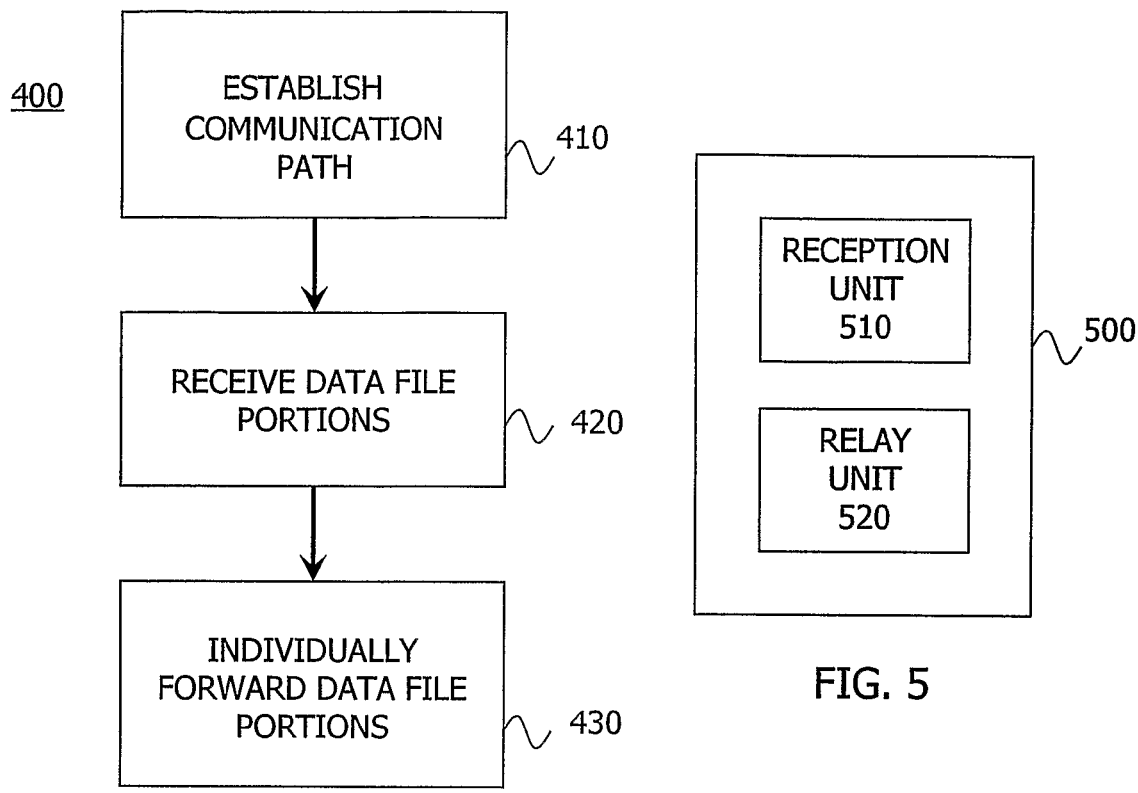
FIG. 4 is a process flow diagram according to a method embodiment of the invention.
FIG. 5 is a schematic diagram according to an apparatus embodiment of the invention.

FIG. 4 discloses a method 400 for delivering a data file, such as an MMS, from an originator (such as a first mobile terminal) having an originator server associated therewith to a recipient (such as a second mobile terminal) having a recipient server associated therewith. The method commences, at step 410, with establishing a communication path from the originator to the recipient via the originator server and the recipient server. The method continues, at step 420, with the receipt, by the originator server from the originator or by the recipient server from the originator server, of at least portions of the data file (uploaded to the originator server from the originator). Thereafter, at step 430, the method continues with the individual forwarding, by the originator server or by the recipient server and without waiting for receipt of the complete data file, of the received portions of the data file for reassembly by the recipient (e.g., based on a sequence number that may be associated with each data file portion).

FIG. 5 illustrates an apparatus 500 to deliver a multimedia data file, such as an MMS, from an originator having an originator server associated therewith to a recipient via an established communication path. The apparatus 500 includes two main components, a reception unit 510 to receive at least portions of the data file from the originator or the originator server, the data file or the data file portions being uploaded to the originator server from the originator, and a relay unit 520 to individually forward the portions of the data files received from the originator or the originator server for reassembly by the recipient, wherein the data file portions are forwarded without waiting for receipt of the complete data file.

The following provides examples of variations that may be optionally used in connection with the embodiments described herein, either alone or in combination where applicable. While the following may describe the network component as being a mobile communications device or mobile unit, it will be appreciated that the foregoing is also applicable to a wide variety of computer network components including wired terminals.

Figure 6:
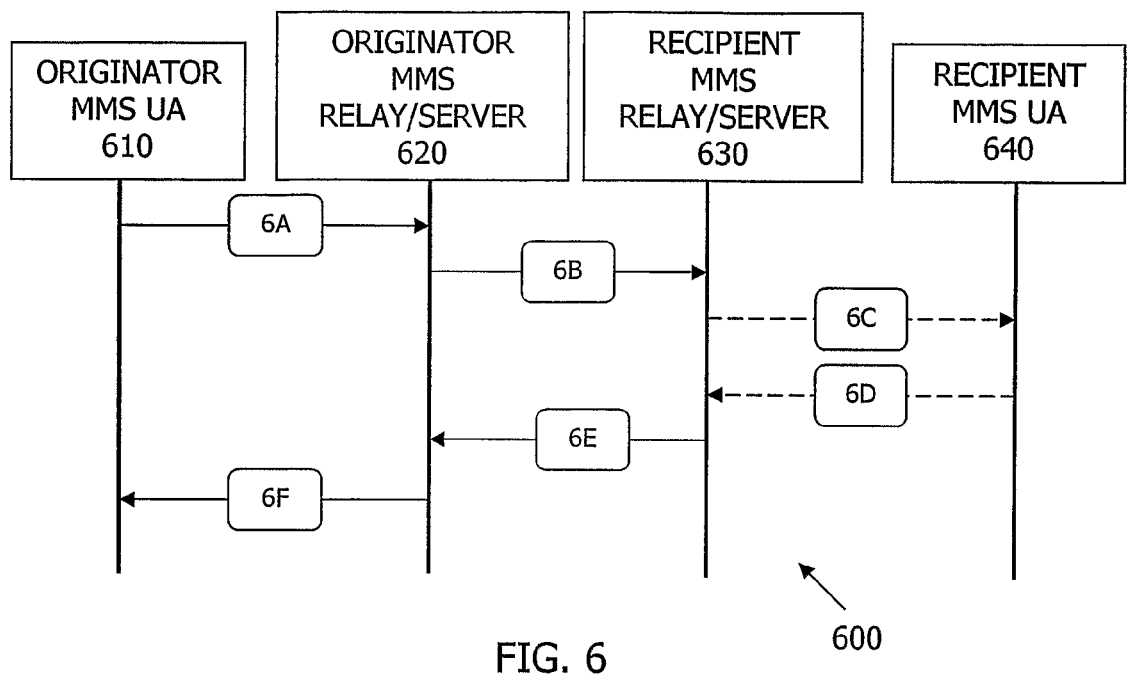
FIG. 6 is a signalling diagram of an example relating to the initiation of the transfer of a multimedia data file useful for understanding and implementing the invention.

With reference to FIG. 6, a signaling diagram 600 is provided in which signals are exchanged among an Originator MMS UA (User Agent) 610, an Originator MMS Relay/Server 620, a Recipient MMS Relay/Server 630, and a Recipient MMS UA 640 as part of a negotiation that takes place prior to the actual transfer of an MMS and regarding the parameters by which the MMS will be delivered from the Originator MMS UA 610 to the Recipient MMS UA 640. It will be noted, that if desired, the Originator MMS Server 620 and Recipient MMS Server 630 may combined within the same physical network entity.

Via signal 6A (which may be an MMS_Comm.REQ signal), the Originator MMS UA 610 sends proposed communication parameters to the Originator MMS Server 620. These communication parameters may comprise a variety of communication principles that will dictate the manner in which an MMS or other multimedia file is ultimately transferred from the Originator MMS UA 610 to the Recipient MMS UA 640. For example, the parameters may include MMS content type and size, codecs applied to code the multimedia file (and/or the underlying content), the number of MMS content parts and optionally the size of each data file portion (which may not be known in advance depending on the desired configuration), the sequence number of each data file portion (unless standardized), the procedure to request lost portions of the data file (unless standardized), information pertaining to the underlying content within each portion of the data file (which may, for example, be used by the Recipient MMS UA 640 to inform the Originator MMS UA 610 that certain portions of the data file need not be transmitted), single or multiple user data file delivery, whether ACKs/NACKS are to be used to (passively) confirm the correct reception of a data file portion, and the like. Moreover, in some variations, the Originator MMS UA 610 may also send several options of communications parameters (e.g., fixed transmission templates) such that the Recipient MMS Server 630 and/or the Recipient MMS UA 640 may select the optimal set of communication parameters.

Signal 6B (which may be an MMS_Comm.REQ signal), that is sent from the Originator MMS Server 620 to the Recipient MMS Server 630, forwards the proposed communication parameters (or sends a modified message signal associated with the communication parameters or a set of communication parameters). Optionally, the Originator MMS Server 620 may also store (e.g., in a local memory or in a database) the information pertaining to the communications parameters contained within signal 6A. Alternatively, signal 6B may simply contain a reference to a particular set of pre-defined communications parameters.

With signal 6C (which may be an MMS_Comm.REQ signal), the Recipient MMS Server 630 forwards the proposed communications parameters (or information pertaining thereto) to the Recipient MMS UA 640. The Recipient MMS Server 630 may also optionally store the information contained within signal 6B (e.g., in a load memory or in a database) prior to sending signal 6C. If the Recipient MMS Server 630 has been provided with information regarding the capabilities of the Recipient MMS UA 640, it may optionally exclude certain proposed communication parameters or modify the individual communication parameters sent within signal 6C.

Via signal 6D (which may be an MMS_Comm.RES signal implicitly containing an MM1_notification.RES indicator), the Recipient MMS UA 640 (which may optionally store the proposed communication parameters) returns a result to the request of signal 6C. The result may be a simple OK indication (meaning that the proposed communication parameters are acceptable), or alternatively, the result may comprise a list of accepted or excluded parameters or a list of modified parameters. These exclusions or changes may be based on defined parameters or limitations present within the Recipient MMS UA 640. If sets of parameters are used, then simplified and more efficient signaling may be exchanged. In case profile information was sent, the result may indicate a selected profile.

As indicated by the dashed-lines in FIG. 6, signals 6C and 6D may not be required depending on the desired configuration. For example, the Recipient MMS Server 630 may access or include a database that contains information relating to the capabilities or multimedia file transfer preferences of the Recipient MMS UA 640, therefore obviating the need for signals 6C and 6D. With this arrangement, the first message containing a data file portion should be preceded by an MM1_notification.REQ message and an MM1_notification.RES message. In the existing MMS specifications, these messages are used to notify the recipient that there is a MMS content that can be retrieved.

The Recipient MMS Server 630, via signal 6E, returns the response regarding the proposed communication parameters to the Originator MMS Server 620. In those cases in which the Recipient MMS Server 630 or the Recipient MMS UA 640 have modified (or reduced) the communication parameters, the Recipient MMS Server 630 may install a converter function and still return the unmodified communication parameters back to the Originator MMS Server 620. This may be done when there are inconsistencies between the proposed communication parameters and the communication parameters supported at the receiving side. The Recipient MMS Relay/Server 630 may then, for example, perform a codec conversion of the actual content, remove color bits and/or perform similar operations.

The Originator MMS Server 620 then returns the communications parameters back to the Originator MMS UA 610 via signal 6F. Optionally, the Originator MMS Server 620 may install a converter function if the communications parameters have not previously been converted by the Recipient MMS Server 630.

In case a data file is being sent to multiple recipient MMS UAs, then the MMS_Comm.REQ signal indicates that the communication parameters might be fixed and cannot be changed (due, in part, to the fact that the data file must be delivered in a uniform manner and the recipient UAs have agreed to such delivery when registering for the multicast or other multiple user session or service). In addition, no MMS_Comm.RES signal may be returned by the Recipient MMS UAs (as such signaling could overload the network).

Figure 7:
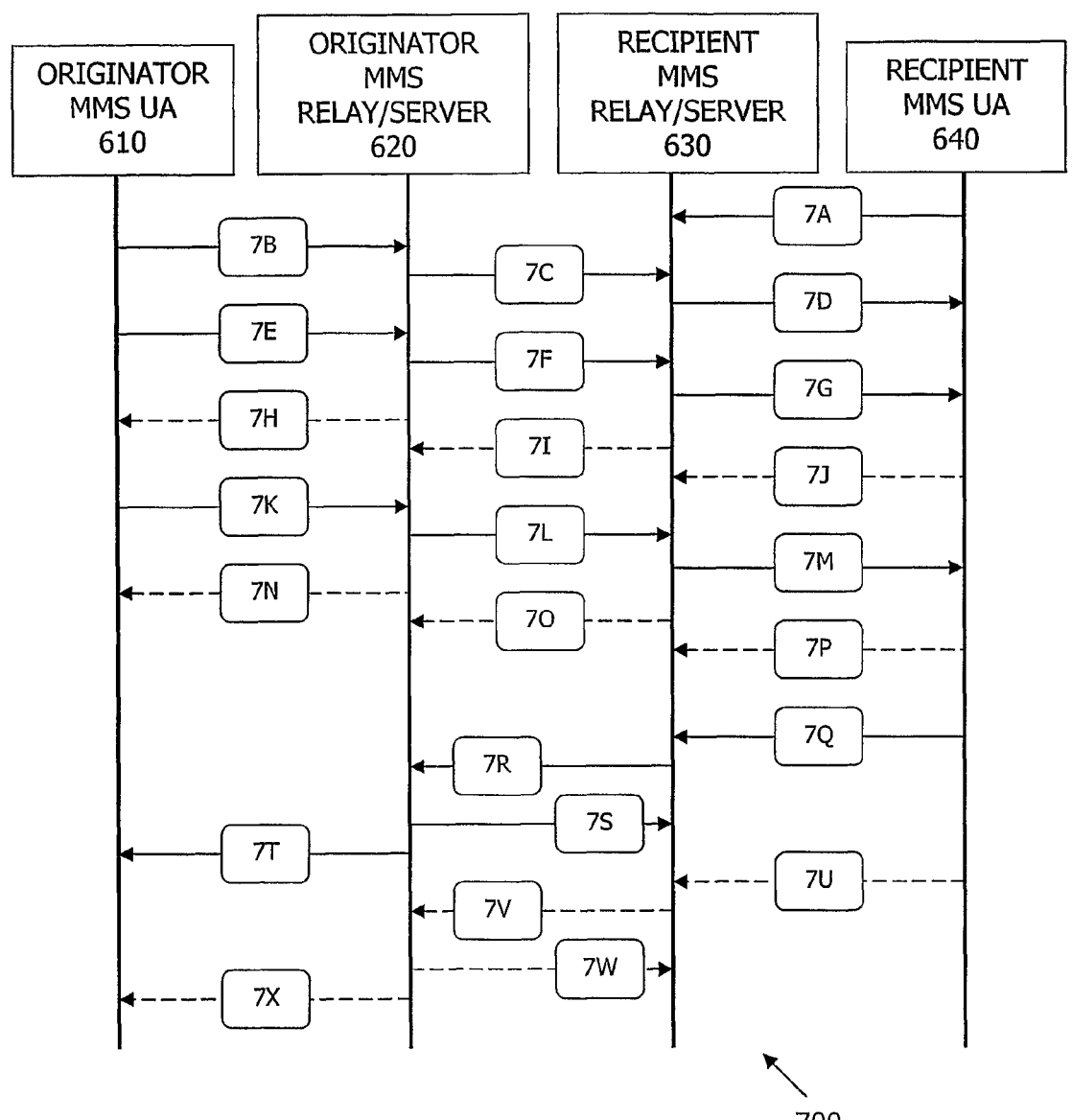
FIG. 7 is a signalling diagram of an example relating to the transfer of a multimedia data file useful for understanding and implementing the invention.

FIG. 7 provides a signaling diagram 700 that illustrates the exchange of signals among the Originator MMS UA 610, the Originator MMS Server 620, a Recipient MMS Server 630, and the Recipient MMS UA 640 in relation to the delivery of an MMS 8 (and, optionally, after the negotiation described with reference to FIG. 6 has been concluded).

The Recipient MMS UA 640 may send signal 7A (such as a MM1_retrieve.REQ signal) to the Recipient MMS Server 630 to initiate the retrieval of a data file portion from the MMS Relay Server 630 (e.g., whenever each data file portion arrives at the Recipient MMS Relay Server 630). Via signal 7B (such as a MM1_submit.REQ signal), the Originator MMS UA 610 uploads a data file portion to the Originator MMS Server 620. Thereafter, by way of signal 7C (such as a MM4_forward.REQ signal), the Originator MMS Server 630 directly (and, optionally, as soon as it has been received) forwards the data file portion to the Recipient MMS UA 630. Next, via signal 7D (such as a MM1_retrieve.RES signal), the Recipient MMS UA 630 directly (and, optionally, as soon as it has been received) forwards the data file portion to the Recipient MMS UA 640. The signaling sequence represented by signals 7B (via signals 7E and 7K), 7C (via signals 7F and 7L), and 7D (via signals 7G and 7M), may be repeated multiple times until all data file portions have been received by the Recipient MMS UA 640.

It will be noted that signal 7A may be sent before, during, or after signals 7B and 7C. However, the delivery of the data file portion to the Recipient MMS UA 640 (via signal 7D) will not commence before signal 7A has been received. In the case of multiuser services, signal 7A may not be sent (and could overload the network), and the data file portions are delivered to the Recipient MMS UA 640 as soon as they are received by the Recipient MMS Server 630.

Each of the data file portions includes a sequence number that may be used to detect missing data file portions and/or for re-assembling purposes. If the Originator MMS Server 620, the Recipient MMS Server 630, or the Recipient MMS UA 640 detects a missing data file portion, such components inform their counterparts in the traffic chain accordingly (as shown by signals 7H, 7I, 7J, 7N, 7O, and 7P all of which are indicated by dashed lines). In order to minimize any further delays and traffic that would result from the retransmission of data file portions that were not correctly received, the Originator MMS Server 620 and the Recipient MMS Server 630 may cache the data file portions in order to avoid such data file portions from being uploaded once more via the radio network.

In addition, or as an alternative, to monitoring for a NACK message (indicating that there is a missing data file portion), it is also possible to use an ACK message to confirm the correct reception of a corresponding data file portion. Such an arrangement, in which data file portions are cached within the Originator MMS Server 620 and the Recipient MMS Server 630, may be particularly useful in scenarios having multiple Recipient MMS UAs and also multiple Recipient MMS Servers so that transmission failures to the Recipient MMS UA 640 do not require additional uploading via the Radio Network.

Moreover, in some variations, a signal from any of the Originator MMS Server 620, the Recipient MMS Server 630, and the Recipient MMS UA 640 may be ultimately sent to the Originator MMS UA 610 indicating that a certain data file portion (or sub-division thereof) need not be transferred. This might be the case for example when the communication parameters include information about the content of different MMS parts. The recipient may then decide that not all content parts are actually needed or wanted. Assume, for example, that an MMS includes a trailer plus video/audio content. In such an scenario the recipient may indicate that only the trailer is wanted. In another scenario the MMS may include slights, video content plus audio content. The recipient may then indicate that only the slights and the audio content are wanted (i.e., that the video content need not be transferred).

Returning to the signaling diagram 700 of FIG. 7, via signal 7Q, the correct reception of the complete data file portion is confirmed by the Recipient MMS UA 640 to the Recipient MMS Server 630 which forwards the confirmation, via signal 7R, to the Originator MMS Server 620 which is acknowledged via signal 7S and subsequently forwarded, via signal 7T, to the Originator MMS UA 610.

Optionally, the Recipient MMS UA 640 may also send a read-reply-report, via signal 7U, to the Recipient MMS Server 630, which in turn forwards the read-reply-report to the Originator MMS Server 620 by way of signal 7V which is acknowledged via signal 7W and forwarded, via signal 7X, to the Originator MMS UA 610. The read-reply-report may also contain diverse information such as when the data file portions were read, how long the data file portions were accessed, etc.

The objective of alternative embodiments is to minimize the terminal impacts on the sender and the receiver. The basic idea is to start the forwarding and notification process as soon as the Originator MMS Relay/Server (i.e., the originator MMSC) can determine the Recipient MMS User Agent and thus the Recipient MMS Relay/Server. In the first variant, the parsing of the MMS is started immediately after the Originating MMSC receives the MM1_submit.REQ message. In the second variant, two new interactions are introduced to upload a message header separately from the message content.

The idea behind both variants is that the intermediate nodes do not need to know the full MMS content. The intermediate nodes just need the header and control information and maybe also a flag, indicating that the actual MMS content is delivered in a "streamed" way. This also means that the end-to-end message sequence is changed for a MMS delivery. The sequence on the interface (e.g., MM1 or MM4) is not necessarily impacted.

Figure 8:
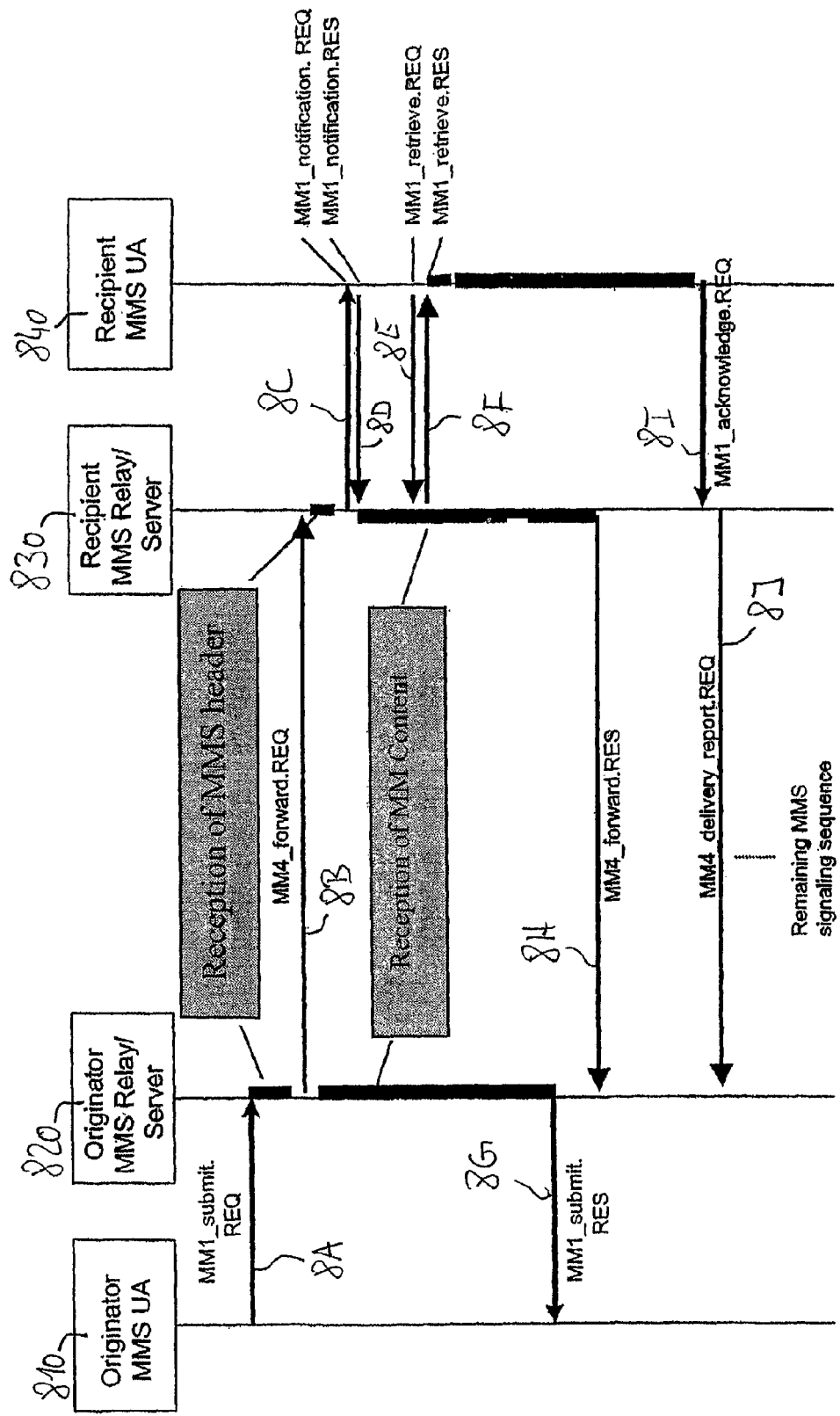
FIG. 8 is a first signalling diagram showing an immediate forwarding and notification process according to the present invention.

FIG. 8 illustrates the first variant of a modified signaling diagram for the progressive MMS delivery. The sequences on the MM1 and the MM4 interfaces are "interleaved", which allows for a much quicker delivery of the MMS from the originator to the recipient.

An Originator MMS User Agent 810 sends the MMS (including a header and control information) "as usual" to an Originator MMSC 820. Here, the Originator MMSC 820 starts processing and evaluating the MMS header and control information as soon as they have been received (it is not necessary to wait for the end of the MMS transmission to evaluate the already received parts). Optionally a "header length" field extends the MM1 message 8A. The field would allow the Originator and a Recipient MMSCs 820, 830 to first count the received bytes, before trying to extract and process the header.

When the Originator MMSC 820 has received the MMS header and control information, the Originator MMSC 820 immediately parses the header and determines a Recipient MMSC 830. The Originator MMSC 820 uses an MM4_forward.REQ message 8B to send the MMS header to the Recipient MMSC 830. The communication link between the Originator and Recipient MMSCs 820, 830 is kept open for the actual MMS content. Optionally, the Originator MMSC 820 keeps a copy of the entire MMS (header and content) for failure operations until it receives a MM4_forward.RES message from the recipient MMSC.

The Originator MMSC 820 has determined the Recipient MMSC 830 capabilities before this procedure. There are several ways to determine the supported capabilities of the Recipient MMSC 830. Here, it is assumed, that the Originator MMSC 820 knows the capabilities of the Recipient MMSC 830.

Optionally, an MMS content length field extends the MM4 messages. This is mainly used for monitoring purposes, since the used protocols between Originator and Recipient MMSC 720, 830 are reliable.

The Recipient MMSC 830 receives first the header and control information for the incoming MMS (e.g. in an initial MMS portion generated by the Originator MMSC 820 by splitting the MMS in a plurality of MMS portions individually forwarded to the Recipient MMSC 830). It allocates a file name for the incoming MMS before the entire MMS is received from the Originator MMSC 820. The URL of the filename is forwarded in the notification message 8C to a Recipient MMS User Agent 840 (the standard procedure for storing the incoming MMS is considered). The Recipient MMSC 830 starts the notification procedure and sends an SMS with the URL to the MMS to the Recipient User Agent 840 although the entire MMS content is not yet available in the Recipient MMSC 830.

In case the recipient terminal is online and available to receive an incoming MMS, the receiving MMS User Agent 840 starts the retrieval procedure and contacts the Recipient MMSC 830 using an MM1_retrieve.REQ message 8E. The Recipient MMSC 830 answers with an MM1_retrieve.RES message 8E, although it does not have yet the full MMS content (it is likely, that the Recipient MMSC 830 has already received further parts of the MMS content, since the notification procedure takes some time). The Recipient MMSC 830 is receiving the MMS content from the Originator MMSC 820 while already delivering the MMS content to the Recipient MMS User Agent 840. Since the MM1 link is usually slower than the MM4 link, the Recipient MMSC 830 will have sufficient information to send to the Recipient MMS User Agent 840.

When the full MMS content has been received from the Originator MMSC 820, the Recipient MMSC 830 responds with an MM4_forward.RES message 8H.

The advantage of this implementation is that existing procedures in the MM1 interface are not modified. Only an infrastructure update is necessary to improve the peer-to-peer sending performance of this system.

Figure 9:
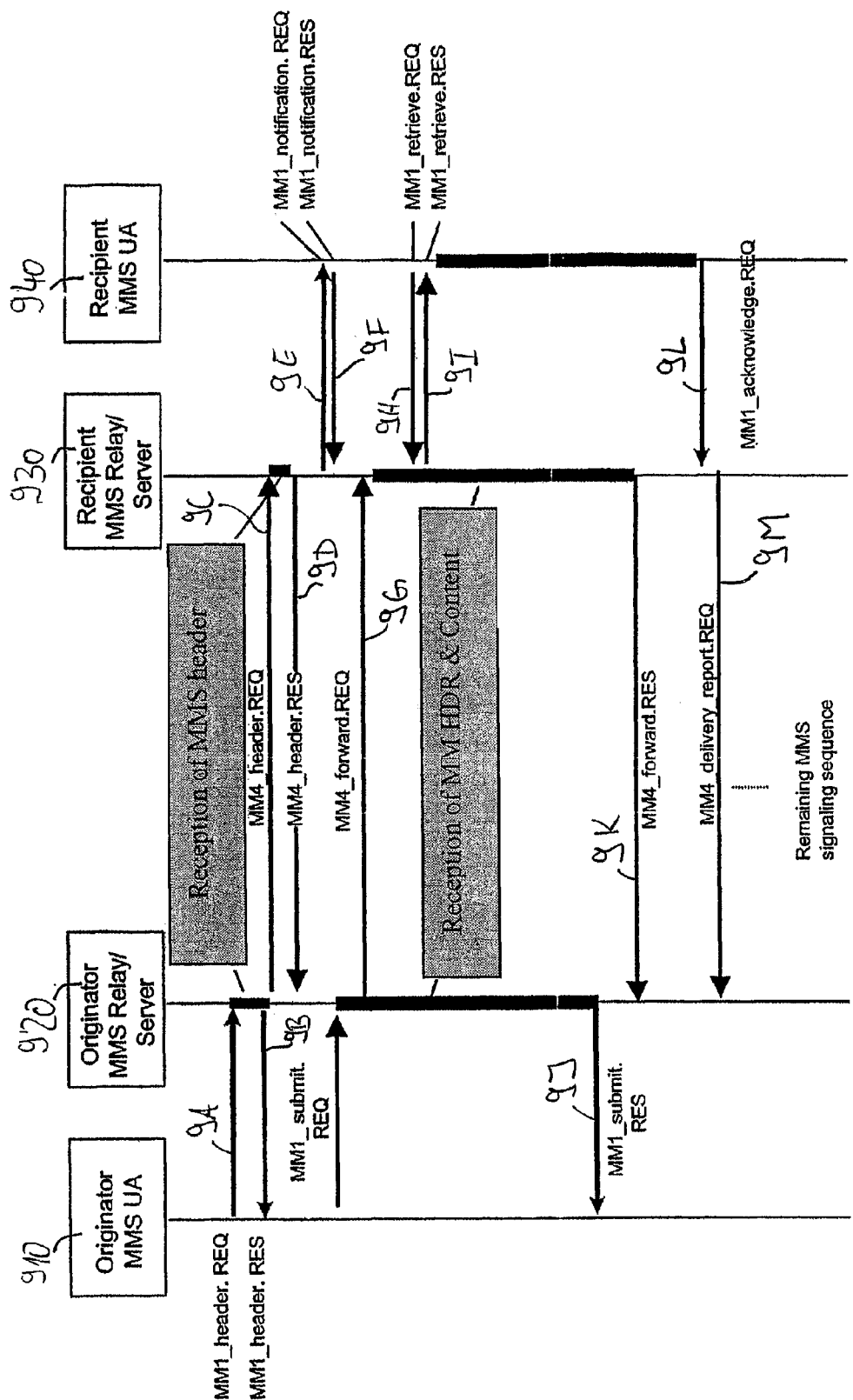
FIG. 9 is a second signalling diagram showing an immediate forwarding and notification process according to the present invention.

The second variant shown in FIG. 9 follows mainly the first variant of FIG. 8. The only difference is that new procedures to forward the header information are introduced. The procedures are used to forward (one or both of) the MMS header and control information (e.g., in an initial MMS portion that is followed by subsequent MMS portions containing the actual MMS content). This allows a network node to first fully receive a transmission before processing it.

The procedures are also used to determine the capabilities of the next node (i.e. Originating and Recipient MMSCs 920, 930). In case the node reacts with an error messages (or not all all), the sender can fall back to standard procedures.

In FIG. 9, a signaling diagram of the second variant is depicted. The MM1_header.[REQ|RES] messages 9A, 9B and MM4_header.[REQ|RES] messages 9C, 9D are newly introduced messages just to forward the MMS header and control information. The Originator MMSC 920 processes this message and establishes a communication path to the Recipient MMSC 930 using the MM4_header messages. Both MMSCs 920, 930 keep state information to handle and forward the actual MMS transmission (optionally only the MMS content).

As soon as the Recipient MMSC 930 receives the MM4_header.REQ message 9C, the notification procedure may be started. The notification message contains an URL to a still empty file. It should be noted that due to the duration of the MM1_notification procedure, the file might already contain parts of the MMS content.

When the Recipient MMS User Agent 940 is online and available to receive an incoming MMS, it starts the MM1 retrieve procedure to fetch the content. In an optimal situation (when also Recipient 940 is online), the Recipient 940 will receive the MMS while the Originator 910 is still sending.

This invention is also beneficial in case an MMS is sent from a server to one or several Recipient MMS UA's, because still the terminating part of the MMS delivery is optimized in that case.

The current invention provides many advantages over conventional techniques for delivering a multimedia data file such as faster delivery (approaching real-time), reduced average holding of network and terminal buffers, and reduced processing capacity requirements. Additionally, there is in principle no limit concerning the (maximum) size of an MMS. Furthermore, as the techniques described herein provide more efficient data transfer, network operators may provide incentives for originator UAs to subdivide multimedia data files prior to transfer, such as by charging a lower tariff.

While the current invention has been described with respect to particular embodiments (including certain system arrangements and certain orders of steps within various methods), those skilled in the art will recognize that the current invention is not limited to the specific embodiments described and illustrated herein. For example, it will be appreciated that the current invention may be used to transfer any type of data file from a first network component (such as an originator user agent) to a second network component (such as a recipient user agent). It will also be understood that the subdivision of the multimedia data file into portions may occur in a recipient MMS server rather than an originator MMS server or even by the WAP gateway (provided that an indication is provided in one of the data file portions). Moreover, it can be appreciated that the individual components shown in FIGS. 2 and 3 may also be involved when practicing the current invention.

Therefore, while the current invention has been described in relation to its preferred embodiments, it is to be understood that this disclosure is only illustrative. Accordingly, it is intended that the invention be limited only by the scope of the claims appended hereto.

The invention claimed is:

1. A method for delivering a multimedia data file, from an originator having an originator server associated therewith to a recipient having a recipient server associated therewith, wherein the multimedia data file is uploaded from the originator to the originator server, the method comprising the steps of:
    establishing a communication path from the originator to the recipient via the originator server and the recipient server;
    receiving, by the recipient server from the originator server, a transfer inquiry containing or referencing an indication that the originator server intends to send the multimedia data file divided into separate data file portions of a proposed size;
    determining by the recipient server, whether the proposed portion size is acceptable to the recipient, wherein the recipient server modifies the transfer inquiry according to predetermined transfer inquiry criteria and forwards the modified transfer inquiry to the recipient;
    if the proposed portion size is acceptable, sending a reply from the recipient server to the originator server indicating that the proposed portion size is acceptable;
    if the proposed portion size is not acceptable:
        sending a reply from the recipient server to the originator server indicating a different, acceptable portion size; or
        when the recipient server includes a converter function, sending a reply from the recipient server to the originator server indicating that the proposed portion size is acceptable, and converting any received data file portions to the acceptable portion size;
    receiving, by the recipient server from the originator server, the data file portions; and
    individually forwarding, by the recipient server and without waiting for receipt of the complete data file, the data file portions received from the originator server for reassembly by the recipient.

2. The method of claim 1, further comprising the step of: receiving, by the recipient server, an acknowledgment that the data file was correctly reassembled.

3. The method of claim 1, further comprising the step of: sending, by the recipient to the recipient server and/or by the recipient server to the originator server, a message indicating that a data file portion has not been received.

4. The method of claim 1, further comprising the step of: sending, by the recipient to the recipient server and/or by the recipient server to the originator server, a message indicating that a data file portion has been properly received.

5. The method of claim 1, further comprising the step of: caching received data file portions by at least one of the originator server and the recipient server.

6. The method of claim 1, further comprising the step of: associating a billing charge with the transfer of the data file based on the amount of processing capacity utilized by at least one of the originator server and the recipient server.

7. The method of claim 1,
    wherein the transfer inquiry also contains or refers to initial communication parameters regarding the transfer of the data file, the initial communication parameters being selected from the group comprising data file content type, data file content size, codecs applied to code the content, the number of parts of the data file, sequence numbering of data file parts, procedure to request lost data file parts, number of recipients, and acknowledgment protocols utilized;
    determining, by the recipient server, whether to modify the initial parameters;
    sending, by the recipient server, a response to the transfer inquiry including or referencing final parameters that include either an acceptance of the initial parameters or modified parameters; and
    receiving, by the recipient server, the data file delivered according to the final parameters for transfer to the recipient.

8. The method of claim 7, wherein the initial parameters contain at least two different techniques for delivering the data file to the recipient and the response includes either an acceptance of one of the at least two different techniques or modified parameters.

9. The method of claim 7, wherein the originator server stores the request.

10. The method of claim 7, wherein the recipient server stores the transfer inquiry.

11. The method of claim 7, wherein the originator selects the communications parameters from at least two pre-defined communication parameters sets.

12. The method of claim 7, further comprising the steps of:
    forwarding, by the recipient server, the transfer inquiry to the recipient; and
    receiving, by the recipient server, a response to the transfer inquiry including the final parameters.

13. The method of claim 7, further comprising the step: of generating, by the recipient server, a response to the transfer inquiry based on predetermined delivery criteria.

14. The method of claim 7, further comprising the step of: converting the response to a format compatible with at least one of the originator server and the originator.

15. An apparatus for delivering a multimedia data file via an established communication path from an originator having an originator server associated therewith to a recipient, the apparatus comprising:
    a processor communicably coupled to a non-transitory memory, wherein when the processor executes computer program instructions stored on the memory, the apparatus is caused to perform the steps of:
        receiving from the originator server, a transfer inquiry containing or referencing an indication that the originator server intends to send the multimedia data file divided into separate data file portions of a proposed size;

determining whether the proposed portion size is acceptable to the recipient, wherein the apparatus modifies the transfer inquiry according to predetermined transfer inquiry criteria and forwards the modified transfer inquiry to the recipient;

if the proposed portion size is acceptable, sending a reply to the originator server indicating that the proposed portion size is acceptable;

if the proposed portion size is not acceptable:
   sending a reply to the originator server indicating a different, acceptable portion size; or
   when the apparatus includes a converter function, sending a reply to the originator server indicating that the proposed portion size is acceptable, and converting any received data file portions to the acceptable portion size;

receiving, from the originator server, the data file portions; and individually forwarding, without waiting for receipt of the complete data file, the data file portions received from the originator server for reassembly by the recipient.

16. A system for delivering a multimedia data file to a recipient, via an established communication path, the system comprising:
   an originator user agent to initiate transmission of the data file;
   a recipient user agent;
   an originator server associated with the originator user agent;
   a recipient server associated with the recipient user agent;
   wherein the originator user agent is configured to upload the data file to the originator server;
   wherein the originator server is configured to send to the recipient server, a transfer inquiry containing or referencing an indication that the originator server intends to send the multimedia data file divided into separate data file portions of a proposed size:
   wherein the recipient server is configured to determine whether the proposed portion size is acceptable to the recipient, wherein the recipient server modifies the transfer inquiry according to predetermined transfer inquiry criteria and forwards the modified transfer inquiry to the recipient;
   wherein if the proposed portion size is acceptable, the recipient server is configured to send a reply to the originator server indicating that the proposed portion size is acceptable;
   wherein if the proposed portion size is not acceptable, the recipient server is configured to send a reply to the originator server indicating a different, acceptable portion size, or when the recipient server includes a converter function, to send a reply to the originator server indicating that the proposed portion size is acceptable, and converting any received data file portions to the acceptable portion size;
   wherein the originator server is configured to split the data file into a plurality of portions of the acceptable portion size, and to individually send the plurality of portions of the data file to the recipient server; and
   wherein the recipient server individually forwards the received data file portions to the recipient for reassembly without waiting for receipt of the complete data file.

17. The method of claim 1 wherein the multimedia data file is a Multimedia Messaging Service (MMS) data file.

18. The apparatus of claim 15 wherein the multimedia data file is a Multimedia Messaging Service (MMS) data file.

19. The system of claim 16 wherein the multimedia data file is a Multimedia Messaging Service (MMS) data file.

* * * * *

UNITED STATES PATENT AND TRADEMARK OFFICE
CERTIFICATE OF CORRECTION

| | |
|---|---|
| PATENT NO. | : 8,095,116 B2 |
| APPLICATION NO. | : 11/720382 |
| DATED | : January 10, 2012 |
| INVENTOR(S) | : Hundscheidt et al. |

It is certified that error appears in the above-identified patent and that said Letters Patent is hereby corrected as shown below:

IN THE SPECIFICATIONS:

In Column 1, Line 38, delete "MA" and insert -- 1A --, therefor.

In Column 2, Line 36, delete "MS" and insert -- MMS --, therefor.

In Column 3, Line 63, delete "portion to" and insert -- portion --, therefor.

In Column 4, Line 8, delete "resuit," and insert -- result, --, therefor.

IN THE CLAIMS:

In Column 16, in Line 2, in Claim 16, delete "size:" and insert -- size; --, therefor.

Signed and Sealed this
Twenty-ninth Day of May, 2012

David J. Kappos
*Director of the United States Patent and Trademark Office*